(12) United States Patent
Bates et al.

(10) Patent No.: US 8,538,990 B2
(45) Date of Patent: Sep. 17, 2013

(54) SCALABLE MECHANISM FOR RESOLVING CELL-LEVEL ACCESS FROM SETS OF DIMENSIONAL ACCESS RULES

(75) Inventors: Kirk Arthur Bates, West Glamorganshire (GB); Rasmus Borgsmidt, Copenhagen (DK); David Stephen Lawrence Bowen, York (GB)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 13/040,522

(22) Filed: Mar. 4, 2011

(65) Prior Publication Data

US 2012/0226656 A1 Sep. 6, 2012

(51) Int. Cl.
G06F 15/16 (2006.01)
G06F 17/20 (2006.01)

(52) U.S. Cl.
USPC ............................ 707/781; 707/786; 707/600

(58) Field of Classification Search
USPC ......................................... 707/600, 781, 786
See application file for complete search history.

(56) References Cited

U.S. PATENT DOCUMENTS

2002/0095405 A1 7/2002 Fujiwara
2003/0014394 A1 1/2003 Fujiwara et al.
2004/0088340 A1* 5/2004 Idicula et al. ................. 707/206
2004/0205086 A1* 10/2004 Harvey et al. ............. 707/103 R
2009/0024565 A1* 1/2009 Wong ............................... 707/2

OTHER PUBLICATIONS

"Apache HTTP Server Version 2.0. Apache Module_rewrite." Apache Software Foundation. Copyright 2011. <http://httpd.apache.org/docs/2.0/mod/mod_rewrite.html>. Retrieved on Jan. 6, 2011.

* cited by examiner

*Primary Examiner* — Alex Gofman
(74) *Attorney, Agent, or Firm* — Mollborn Patents, Inc.; Fredrik Mollborn

(57) ABSTRACT

Methods and apparatus, including computer program products, implementing and using techniques for resolving cell-level access in a multi-dimensional data structure based on one or more sets of dimensional access rules. A business hierarchy is provided with nodes arranged in a tree structure. An online analytical processing database has several data cubes, where at least some have the business hierarchy as one of their dimensions. One or more rule-based access tables are provided for controlling access to cells of each data cube. Groups of nodes with identical access settings are identified in the business hierarchy. A single access block is generated per node group. Each access block is a serializable access specification object that contains information for generating a complete cell-level mask of access settings for a single node of the business hierarchy. The mask is generated based on the information in the access blocks for each node in the hierarchy.

16 Claims, 2 Drawing Sheets

200

Access Table A

| Access | Products | Business Hierarchy E |
|---|---|---|
| No Access | <All Products> | <All Leaf Nodes> |
| Write | <Red Products> | <Leaf Node Subset 1> |
| Write | <Blue Products> | <Leaf Node Subset 2> |

Access Table B

| Access | Months |
|---|---|
| Read | <Full Year> |
| Write | <Future Time Periods> |

FIG. 3

SCALABLE MECHANISM FOR RESOLVING CELL-LEVEL ACCESS FROM SETS OF DIMENSIONAL ACCESS RULES

BACKGROUND

The present invention relates to databases, and more specifically, to operations on multi-dimensional data structures. In a software system which operates on multi-dimensional data structures, and which incorporates the notion of cell-level access settings to control the access to be granted at each data point, it is often beneficial to express these access settings through a set of access rules, as opposed to simply creating a mask of settings that covers every single cell. There are several reasons for this. For example, a single access rule may determine the settings for an entire region of cells, which makes the representation more compact; access settings often vary across certain dimensions but not others, which can be easily expressed in an access rule; and multiple overlapping rules can be used to define complex access patterns without being as complicated to maintain as a mask.

Irrespective of the way in which the access settings are presented to the user and stored in the model definition, at runtime the system will need to know which access setting to apply for each cell. Therefore, at some point, the system has to resolve the set of access rules to determine the cell-level access settings.

Some software systems, such as the enterprise planning software "Cognos Planning" which is available from International Business Machines Corporation of Armonk, N.Y., also use a specific business hierarchy to control the planning workflow (in IBM Cognos Planning known as the EList). In such systems, it is also desirable to appropriately manage the access specification at the aggregate levels of the business hierarchy. While it is possible for a system to allow the access to be set explicitly at every level of the business hierarchy, there are many usability complications to take into account with this approach.

SUMMARY

According to one embodiment of the present invention, methods and apparatus, including computer program products are provided for resolving cell-level access in a multi-dimensional data structure based on one or more sets of dimensional access rules. A business hierarchy is provided. The business hierarchy includes several nodes arranged in a tree structure having one or more levels. An online analytical processing database is provided that includes several data cubes, where at least some of the data cubes have the business hierarchy as one of their dimensions. One or more rule-based access tables are provided for controlling access to one or more cells of each data cube. One or more groups of nodes with identical access settings are identified in the business hierarchy. A single access block is generated per group of nodes. Each access block is a serializable access specification object that contains information for generating a complete cell-level mask of access settings for a single node of the business hierarchy. The cell-level mask of access settings is generated based on the information in the access blocks for each node in the business hierarchy.

The details of one or more embodiments of the invention are set forth in the accompanying drawings and the description below. Other features and advantages of the invention will be apparent from the description and drawings, and from the claims.

DESCRIPTION OF DRAWINGS

FIG. 2 shows an access table in accordance with one embodiment.

FIG. 3 shows an access table in accordance with one embodiment.

Like reference symbols in the various drawings indicate like elements.

DETAILED DESCRIPTION

Overview

Figure 1:
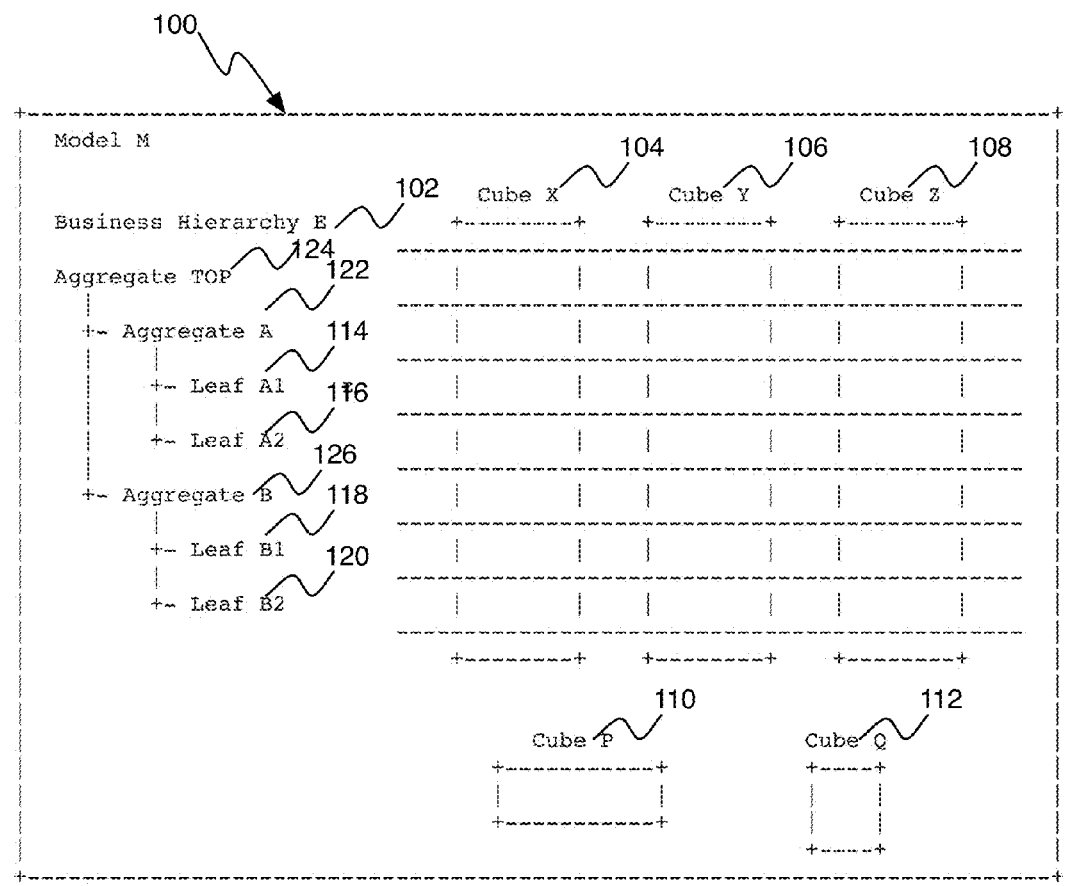
FIG. 1 schematically shows a model M with a business hierarchy E and five data cubes, in accordance with one embodiment.

The various embodiments of the invention pertain to methods and apparatus for resolving access rules to determine the cell-level access settings. In general, in accordance with the various embodiments, this can be accomplished by restricting the access settings to be specified only at the leaf-level of the business hierarchy, and then let every other node see the aggregate view of its immediate children. Furthermore, multiple nodes often have the exact same access pattern across the entire dataset, that is, they see the same set of products, have write access to the same set of employees, etc. In some cases every node of the business hierarchy shares the same view but more frequently the nodes fall into a number of categories. Thus, the system must recognize these conditions and reuse information where appropriate, instead of unnecessarily storing redundant information or wasting processing power resolving the same access patterns over and over again.

In summary, there are three tasks which a software system must handle to achieve a scalable, efficient mechanism for access resolution:

Task 1: For any leaf node, the software system must be able to resolve the access rules specified by the user into a mask of access settings to be applied at runtime.

Task 2: For any aggregate node, the software system must be able to generate a suitable mask of access settings from information that applies solely to its immediate children.

Task 3: The system must be able to recognize when multiple nodes have exactly the same access settings across the entire dataset and to reuse this information in order to preserve both storage space and processing time.

In accordance with the various embodiments, this is accomplished by creating a partitioning schema in a multi-dimensional space for distributed computation. The compiled result can be applied later a run-time without much overhead (as all the rules have been compiled in sub-hash tables and optimized in a way from bottom-up).

In accordance with the various embodiments, and as will be described in further detail below, Task 1 is handled by serializing the pre-resolved access information into little, node-specific packages, also referred to as access blocks. Since by definition all leaf nodes are independent of each other, the system may carry out the work in parallel on multiple job servers.

The availability of the access blocks enables a software system to handle Task 2 very efficiently. For each aggregate node in the business hierarchy, the system may simply aggregate the set of access blocks relevant to its immediate children and store the result in a new access block. Furthermore, nodes in separate sub-trees of the business hierarchy may be resolved independently of each other, so the system may also carry out this work in parallel on multiple job servers.

Task 3 is important in order to minimize the work required to fully resolve the access information, as well as the space required to store the information. The various embodiments of the invention handle this task by performing an up-front analysis on the access information, which groups the nodes by access pattern. The system then generates and stores only one access block per group of nodes instead of one per node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary Embodiments

An embodiment of the invention will now be described by way of example and with reference to the drawings. It should, however, be realized that there are many further variations that can be envisioned and realized by those of ordinary skill in the art and that still fall within the scope of the claims.

FIG. 1 schematically shows a model M (100) with a business hierarchy E (102) and five data cubes X (104), Y (106), Z (108), P (110) and Q (112) in accordance with one embodiment. The business hierarchy E (102) is a hierarchy with seven nodes in three levels. There are four leaf nodes A1 (114), A2 (116), B1 (118) and B2 (120). Leaf nodes A1 and A2 roll into an aggregate node A (122), which, in turn, rolls into the aggregate top-level node TOP (124). Leaf nodes B1 and B2 roll into the aggregate node B (126), which, in turn, rolls into the aggregate top-level node TOP (124).

Data cubes X, Y and Z are data cubes that have the business hierarchy E as one of their dimensions. The data cubes may also have other dimensions in addition to E, some of which may or may not also be shared with the other cubes. Since E is a dimension of the data cubes X, Y and Z, each node has its own "slice" of data in each cube. The data cubes P and Q are also multi-dimensional data cubes but do not have E as one of their dimensions. Thus, all nodes in the business hierarchy will see the same set of data in these cubes.

In addition to the objects depicted in the diagram above, the model M also includes a set of rule-based access tables (not shown) that control the access granted to the cells of each cube in the model. As the skilled person realizes, there are many ways in which the access tables can be structured. For the purposes of this example, the following structure will be used:

The model M has n access tables; T1, ..., Tn, each of which controls the access to a subset of the cubes in the model. A given access table Tk can control the access to multiple cubes in M, and the access to a single cube in M can be controlled by multiple access tables. Expressed differently, there is a many-to-many relationship between the access tables and the multiple cubes in M. Each access table controls the access with respect to a set of dimensions shared by all the cubes to which access table applies. The set of dimensions can be a subset of the cube dimensions or it can be the full set. Thus, in some embodiments, an access table does not necessarily control the access along every dimension of a cube, but instead multiple access tables can be used in combination to achieve the access control to the various dimensions. When multiple access tables are combined in this way, the resulting access setting used for any given cell is the most restrictive access setting dictated by any of the access tables. For example, if finding the access setting for a particular cell requires the combination of two access tables, of which one specifies READ access and the other specifies WRITE access for the relevant coordinate(s), then the resulting access granted to the cell is READ.

In some embodiments, each access table includes an Access column and a set of Dimension columns corresponding to the set of dimensions controlled by the access table. The Access column is used to specify access settings such as READ or WRITE, or any other access setting supported by the system. The Dimension columns are used to specify the set of members of each dimension, for which to apply the access setting in the Access column. Each row in the access table therefore defines an access rule; "Apply THIS access to THESE members of DIMENSION 0 by THESE members of DIMENSION 1 by . . . " etc. In some embodiments, it is possible for the rules of an access table to control overlapping regions. Thus, to resolve the situation, the rules are applied from top to bottom. That is, the "last one in" wins.

FIG. 2 shows an example of an access table (200) in accordance with one embodiment. As was described above, an access table can be used with multiple cubes. The only requirement is that each cube must have all the dimensions specified by the access table. As can be seen in FIG. 2, Access Table A (200) includes the Business Hierarchy E (102), which means that the access defined by Access Table A (200) is potentially node-variant. Access Table A (200) also includes a Products dimension so that access can be defined for Products by Node. Each row of Access Table A (200) defines an access rule, and these access rules are applied from top to bottom so that the "last one in" wins. In Access Table A (200), the first rule states that none of the nodes have access to any of the products. In many embodiments, it is common to have an initial rule like this that removes all the access, and successively then build up regions of cells where access is needed.

The effect of Access Table A (200) is that nodes specified by the <Leaf Nodes Subset 1> rule have Write access to the products specified by the <Red Products> rule, and that nodes specified by the <Leaf Nodes Subset 2> rule have Write access to the products specified by the <Blue Products> rule. Assuming that the rules define non-overlapping sets, any other combination of leaf node and product will have a 'No Access' access setting. Aggregate nodes will of course see everything that their children see, so an ancestor of nodes in Leaf Node Subset 1 and nodes in Leaf Node Subset 2 will see both 'Red' and 'Blue' products.

FIG. 3 shows an example of another access table (300) in accordance with one embodiment. As can be seen in FIG. 3, Access Table B (300) does not include the business hierarchy E (102). Access Table B (300) merely sets up access according to a time dimension called "Months." This means that Access Table B (300) will have the same impact on every node in the business hierarchy (102), that is, the access defined in Access Table B (300) is node-invariant. In Access Table B (300), the first rule sets every cell to read-only and the second rule then adds write access for cells belonging to future time periods.

With these definitions in mind, a detailed example will now be described of how a software system operating in accordance with one of the embodiments can solve the above-described problems, beginning with the up-front access analysis. For ease of reference and consistency, this step of the process will be referred to as "Task 0." The purpose of Task 0 is to identify groups of nodes with identical access settings. In order to do that, the system must analyze the specified settings either by looking at the access rules directly, or by resolving the rules (partially) and analyze the resulting information. However, fully resolving every access rule for every node would defeat at least part of the purpose of the analysis.

Attempting to analyze the rules directly has two problems. First, it is complicated as rules may overlap and multiple access tables may need to be combined in order to complete the analysis. Second, there will likely be some overlap in the process required to resolve the cell-level access and the process required to analyze the rules, which means that the system would be implementing the same, or at least similar, logic in multiple places. Therefore, it is preferable for the system to use its standard mechanism for resolving the cell-level access in Task 0, but to stop the process as soon as sufficient information is present to determine the grouping of nodes. Fortunately there are certain parts of the access specification with no impact on the grouping of nodes. For example, the access defined by access tables that do not include the business hierarchy as a controlled dimension is node-invariant and can therefore be ignored in the analysis. Furthermore, as will be described below, the system does not need to include aggregate nodes in its analysis in order to achieve an efficient grouping. Thus, in order to complete Task 0, the system will first resolve the cell-level access for all leaf nodes as specified by access tables that include the business hierarchy, and then group the nodes according to the result.

Having completed this analysis, Task 1 (that is, resolve the access rules specified by the user into a mask of access settings to be applied at runtime for every leaf node) is then straightforward. The system generates a single access block per group of nodes determined in Task 0. In some embodiments a simple lookup table can be used to keep track of which access block to use for a particular node. Each access block can be generated independently and in some implementations, the system may therefore choose to generate them in parallel on multiple job servers. An access block can be described as a serializable access specification object that contains the information required to quickly generate a complete cell-level mask of access settings for a single node of the business hierarchy. It does not necessarily embed the mask in its final form, but it is much closer in nature to the mask than to an access table, which may contain arbitrarily complex access rules spanning any number of nodes. Another key property of the access block is, that every access block of a model is identically structured. That is, they all embed the same cell-level access structures, or at least have mechanisms in place to identify the common components. This is important in relation to the following task, as will be described in further detail below. The system has now generated all the access blocks required to service the leaf nodes of the business hierarchy.

Moving on to Task 2 (i.e. generating a suitable mask of access settings for an aggregate node from information that applies just to its immediate children), in one embodiment the system uses the leaf node access blocks to generate access blocks for the aggregate nodes. Because of the simplification mentioned in the overview, that every aggregate node in the model see the aggregate view of its immediate children, this task is relatively straightforward. Working bottom-up through the levels of the business hierarchy, the access block for each aggregate node is created by aggregating the set of access blocks of its immediate children. In one embodiment, the aggregation function used in this process is "Least Restrictive," such that each aggregate node sees everything that any of its immediate children sees (and by extension any node below it in the hierarchy). Using an aggregation function such as "Least Restrictive" also has the important consequence that aggregating a set of identical access blocks yields a result that's identical to the inputs. Consequently, if all the immediate children of an aggregate node use the same identical access block, then there is no reason to complete the aggregation step for that node at all. Instead, the system may simply note in the access block lookup table that yet another node is reusing one of the existing access blocks. Conveniently, this effect ripples up the business hierarchy, such that if at the next level a full set of children again share a single access block, then their parent is also assigned that access block in the access block lookup table and so on. For this reason, in cases where the nodes all share the same identical access pattern, it will be sufficient for the system to generate a single data block.

Similarly to the generation of leaf node access blocks in Task 1, the aggregation of access blocks in Task 2 may be spread out across multiple job servers if required. Nodes in separate subtrees of the business hierarchy are independent of each other, as long as the system makes sure to work bottom-up (leaf-to-top) through the levels of the hierarchy.

Once this process has been completed, the access settings have been near-fully resolved, ready for the system to use at runtime, in a way that is scalable, limits the amount of work done, and conserves space by reusing information when possible.

There are a number of advantages that can be accomplished with the above described techniques. For example, the re-use of masks is a big saving in an environment where there are many users trying to access the system concurrently. Compared to generating the masks "on the fly", it is possible to support a much larger number of simultaneous users if the above techniques are used. Since the masks are preemptively generated across a cluster of machines, they are always instantly available when the system needs them. The upfront analysis allows us to determine the optimal set of masks to generate. Storing the lower level security information makes it possible to rapidly create the security masks for the higher levels. Also, if the access settings for a collection of siblings is the same those settings can simply be re-used for their parent with no further work.

In summary, some of the technical features of the invention that improve on known techniques include:
  i) Storing the resulting masks;
  ii) Performing an upfront analysis to determine what masks to create;
  iii) Performing complex re-use analysis to minimize the amount of work and the number of masks to create;
  iv) Taking advantage of work done already to speed up the calculation of higher-level masks (as the "node tree" is traversed);
  v) Distributing the work over a cluster;

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for resolving cell-level access in a multi-dimensional data structure in a database based on one or more sets of dimensional access rules, the method comprising:
  providing a business hierarchy, the business hierarchy including a plurality of nodes arranged in a tree structure having one or more levels;
  providing an online analytical processing database including a plurality of data cubes, wherein at least some of the data cubes have the business hierarchy as one of their dimensions;
  providing one or more rule-based access tables for controlling access to one or more cells of each data cube;
  identifying one or more groups of nodes in the business hierarchy that have identical access settings;
  generating a single access block per group of nodes, each access block being a serializable access specification object that contains information for generating a complete cell-level mask of access settings for a single node of the business hierarchy;
  for each node in the business hierarchy, generating the cell-level mask of access settings based on the information in the access blocks, wherein generating the cell-level access mask includes:
    generating access blocks for the leaf nodes in the business hierarchy;
    traversing the tree from the leaf nodes until the top node of the business hierarchy is reached; and
    for each aggregate node in the business hierarchy that is traversed, generating an access block by aggregating the access blocks for the immediate child nodes of the aggregate node.

2. The method of claim 1, wherein each access table controls the access to a subset of data cubes with respect to a set of dimensions shared by the data cubes in the subset of data cubes.

3. The method of claim 1, wherein multiple access tables are used in combination to achieve access control for various dimensions of the data cubes, and wherein the resulting access setting for a cell is the most restrictive access setting dictated by any of the access tables that apply to the cell.

4. The method of claim 1, wherein each access table includes an access column and one or more dimension columns corresponding to the set of dimensions controlled by the access tables, and wherein the access column specifies access settings and the one or more dimension columns specify the set of members for each dimension for which to apply the access settings.

5. The method of claim 1, wherein identifying one or more groups of nodes includes:
resolving cell-level access for all leaf nodes in the business hierarchy as specified by access tables that include the business hierarchy; and
grouping the leaf nodes according to the determined cell-level access.

6. The method of claim 1, wherein the access blocks are generated in parallel on multiple job servers.

7. The method of claim 1, wherein aggregating the access blocks is performed using a least restrictive aggregation function.

8. The method of claim 1, further comprising:
identifying when all immediate child nodes of an aggregate node use the same access block; and
reusing the access block for the aggregate node.

9. A computer program product for resolving cell-level access in a multi-dimensional data structure based on one or more sets of dimensional access rules, the computer program product comprising:
a non-transitory computer readable storage medium having computer readable program code embodied therewith, the computer readable program code comprising:
computer readable program code configured to provide a business hierarchy, the business hierarchy including a plurality of nodes arranged in a tree structure having one or more levels;
computer readable program code configured to provide an online analytical processing database including a plurality of data cubes, wherein at least some of the data cubes have the business hierarchy as one of their dimensions;
computer readable program code configured to provide one or more rule-based access tables for controlling access to one or more cells of each data cube;
computer readable program code configured to identify one or more groups of nodes in the business hierarchy that have identical access settings;
computer readable program code configured to generate a single access block per group of nodes, each access block being a serializable access specification object that contains information for generating a complete cell-level mask of access settings for a single node of the business hierarchy;
computer readable program code configured to, for each node in the business hierarchy, generate the cell-level mask of access settings based on the information in the access blocks, wherein the computer readable program code configured to generate the cell-level access mask includes:
computer readable program code configured to generate access blocks for the leaf nodes in the business hierarchy;
computer readable program code configured to traverse the tree from the leaf nodes until the top node of the business hierarchy is reached; and
computer readable program code configured to, for each are aggregate node in the business hierarchy that is traversed, generate an access block by aggregating the access blocks for the immediate child nodes of the aggregate node.

10. The computer program product of claim 9, wherein each access table controls the access to a subset of data cubes with respect to a set of dimensions shared by the data cubes in the subset of data cubes.

11. The computer program product of claim 9, wherein multiple access tables are used in combination to achieve access control for various dimensions of the data cubes, and wherein the resulting access setting for a cell is the most restrictive access setting dictated by any of the access tables that apply to the cell.

12. The computer program product of claim 9, wherein each access table includes an access column and one or more dimension columns corresponding to the set of dimensions controlled by the access tables, and wherein the access column specifies access settings and the one or more dimension columns specify the set of members for each dimension for which to apply the access settings.

13. The computer program product of claim 9, wherein the computer readable program code configured to identify one or more groups of nodes includes:
computer readable program code configured to resolve cell-level access for all leaf nodes in the business hierarchy as specified by access tables that include the business hierarchy; and
computer readable program code configured to group the leaf nodes according to the determined cell-level access.

14. The computer program product of claim 9, wherein the access blocks are generated in parallel on multiple job servers.

15. The computer program product of claim 9, wherein aggregating the access blocks is performed using a least restrictive aggregation function.

16. The computer program product of claim 9, further comprising:
computer readable program code configured to identify when all immediate child nodes of an aggregate node use the same access block; and
computer readable program code configured to reuse the access block for the aggregate node.

* * * * *